(12) United States Patent
Twigg et al.

(10) Patent No.: US 7,485,270 B2
(45) Date of Patent: *Feb. 3, 2009

(54) PROCESS FOR TREATING COMPRESSION IGNITION ENGINE EXHAUST GAS

(75) Inventors: Martyn Vincent Twigg, Cambridge (GB); Paul Richard Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 286 days.

This patent is subject to a terminal disclaimer.

(21) Appl. No.: 10/527,633

(22) PCT Filed: Sep. 15, 2003

(86) PCT No.: PCT/GB03/04006

§ 371 (c)(1), (2), (4) Date: Oct. 7, 2005

(87) PCT Pub. No.: WO2004/025096

PCT Pub. Date: Mar. 25, 2004

(65) Prior Publication Data

US 2006/0162317 A1  Jul. 27, 2006

(30) Foreign Application Priority Data

Sep. 13, 2002 (GB) .................................. 0221228.0
Feb. 18, 2003 (GB) .................................. 0303660.5

(51) Int. Cl.
B01D 53/74 (2006.01)
B01D 53/94 (2006.01)
F01N 3/10 (2006.01)

(52) U.S. Cl. ................. 423/213.2; 423/213.5; 423/246; 60/272; 60/274; 60/282; 60/299; 60/302

(58) Field of Classification Search ............... 423/213.2, 423/213.5, 246; 60/272, 274, 282, 299, 302
See application file for complete search history.

(56) References Cited

U.S. PATENT DOCUMENTS

| | | | |
|---|---|---|---|
| 3,741,725 A | 6/1973 | Graham | |
| 4,087,384 A | 5/1978 | Davis | |
| 4,153,579 A | 5/1979 | Summers et al. | |
| 4,686,827 A | 8/1987 | Wade et al. | |
| 4,900,517 A | 2/1990 | Domesle et al. | |
| 5,335,492 A | 8/1994 | Zirkel | |
| 6,293,096 B1 | 9/2001 | Khair et al. | |
| 6,375,910 B1 | 4/2002 | Deeba et al. | |
| 6,555,081 B2 | 4/2003 | Hori et al. | |
| 6,564,545 B1 * | 5/2003 | Dong .................... | 60/289 |
| 6,606,856 B1 | 8/2003 | Brown et al. | |
| 6,756,338 B2 | 6/2004 | Koo et al. | |
| 6,829,889 B2 | 12/2004 | Saito et al. | |
| 6,912,847 B2 | 7/2005 | Deeba | |
| 6,978,603 B2 | 12/2005 | Asanuma | |
| 2002/0048542 A1 | 4/2002 | Deeba et al. | |
| 2002/0053202 A1 | 5/2002 | Akama et al. | |
| 2004/0065078 A1 | 4/2004 | Schafer-Sindlinger et al. | |
| 2006/0156709 A1 | 7/2006 | Twigg et al. | |

FOREIGN PATENT DOCUMENTS

| | | |
|---|---|---|
| DE | 41 17 364 A1 | 12/1992 |
| EP | 0 341 832 A2 | 11/1989 |
| EP | 0 560 991 A1 | 9/1993 |
| EP | 0 602 865 A1 | 6/1994 |
| EP | 0 613 714 A2 | 9/1994 |
| EP | 0 758 713 A1 | 2/1997 |
| EP | 0 786 284 A1 | 7/1997 |
| EP | 0 885 650 A2 | 12/1998 |
| EP | 0 885 650 A3 | 12/1998 |
| EP | 1 180 390 A1 | 2/2002 |
| GB | 2 290 488 A | 1/1996 |
| JP | 5-59937 | 3/1993 |
| JP | 7-251073 A | 10/1995 |
| JP | 8-14029 | 1/1996 |
| JP | 2002-045702 | 2/2002 |
| JP | 2002-129937 | 5/2002 |
| WO | WO-94/22564 | 10/1994 |
| WO | WO-95/00235 | 1/1995 |
| WO | WO-95/35152 | 12/1995 |
| WO | WO-96/39576 | 12/1996 |
| WO | WO-00/28196 | 5/2000 |

(Continued)

OTHER PUBLICATIONS

Olof Erlandsson et al., "Hydrocarbon (HC) Reduction of Exhaust Gases from a Homogeneous Charge Compression Ignition (HCCI) Engine Using Different Catalytic Mesh-Coatings," *SAE Technical Paper Series*, Paper No. 2000-01-1847, presented at the SAE International Spring Fuels & Lubricants Meeting & Exposition; Paris, France; Jun. 19-22, 2000.

(Continued)

*Primary Examiner*—Timothy C Vanoy
(74) *Attorney, Agent, or Firm*—RatnerPrestia

(57) ABSTRACT

A process for treating exhaust gas from a compression ignition engine wherein substantially all fuel for combustion is injected into a combustion chamber prior to the start of combustion comprises contacting the exhaust gas with a catalyst comprising a supported palladium (Pd) catalyst.

32 Claims, No Drawings

FOREIGN PATENT DOCUMENTS

| WO | WO-00/29726 | 5/2000 |
| --- | --- | --- |
| WO | WO-00/59611 | 10/2000 |
| WO | WO-01/14046 A1 | 3/2001 |
| WO | WO-01/74476 A1 | 10/2001 |
| WO | WO-02/26379 A1 | 4/2002 |
| WO | WO-02/083301 A2 | 10/2002 |
| WO | WO-02/083301 A3 | 10/2002 |

OTHER PUBLICATIONS

Magnus Christensen et al., "The Effect of Piston Topland Geometry on Emissions of Unburned Hydrocarbons from a Homogeneous Charge Compression Ignition (HCCI) Engine," *SAE Technical Paper Series*, Paper No. 2001-01-1893, presented at the SAE International Spring Fuels & Lubricants Meeting & Exposition; Orlando, Florida; May 7-9, 2001.

Yasushi Mase et al., "Nissan's New Multivalve DI Diesel Engine Series," SAE Technical Paper Series, Paper No. 981039, presented at the International Congress and Exposition, Detroit, Michigan, Feb. 23-26, 1998.

Pages 10-26 of Annex 1 to the Notice of Opposition to European Patent No. 1 537 304, owned by Johnson Matthey Public Limited Company, filed by Umicore AG & Co. KG on Nov. 28, 2007.

Heywood, John B., *Internal Combustion Engine Fundamentals*, McGraw-Hill, Apr. 1988, pp. 592-593.

\* cited by examiner

PROCESS FOR TREATING COMPRESSION IGNITION ENGINE EXHAUST GAS

This application is the U.S. national phase application of PCT International Application No. PCT/GB2003/004006, filed Sep. 15, 2003, and claims priority of British Patent Application No. GB 0221228.0, filed Sep. 13, 2002, and British Patent Application No. 0303660.5, filed Feb. 18, 2003

FIELD OF THE INVENTION

The present invention relates to a process for treating exhaust gases from a compression ignition engine and in particular, an engine wherein substantially all fuel for combustion is injected into a combustion chamber prior to start of combustion.

BACKGROUND OF THE INVENTION

Conventional diesel engines produce less gaseous hydrocarbon (HC) and carbon monoxide (CO) than gasoline engines and it is possible to meet present legislated limits for these components using a platinum (Pt)-based diesel oxidation catalyst (DOC). Diesel nitrogen oxides ($NO_x$) emissions are presently controlled by engine management, such as exhaust gas recirculation (EGR). As a consequence, however, diesel particulate matter (PM) emissions including volatile and soluble organic fractions (VOF and SOF respectively) are increased. The DOC is used to treat VOF and SOF in order to meet presently legislated limits for PM.

Two ways of reducing compression ignition engine emissions, which can be used in addition to exhaust gas after treatment, are engine management and engine design. More recently, a new generation of compression ignition engines have been developed which use a range of engine management techniques to lower the combustion temperature. One such technique is for substantially all fuel for combustion to be injected into a combustion chamber prior to the start of combustion.

An advantage of these techniques is that they can reduce $NO_x$ and PM emissions, without significantly increasing fuel consumption. An embodiment of the new generation of engines which employs these techniques is known as a Homogeneous Charge Compression Ignition (HCCI) diesel engine. Characteristics of an HCCI diesel engine include homogeneous fuel charge for external or internal mixture formation by variable valve timing, increased swirl ratio, injection rate control (multiple injection) and adapted spray configuration; high dilution rate for a moderate burn rate; low $NO_x$ by charge dilution and low combustion temperature; and low PM by prolonging the time for mixture preparation and, consequently, homogenisation. All relative terms are compared to a normal direct injection diesel engine.

Another new compression ignition engine is known as the Dilution Controlled Combustion System (DCCS), for example Toyota's Smoke-less Rich Combustion concept. Characteristics of DCCS include conventional direct injection; extremely high dilution rate to lower combustion temperature below soot formation threshold by increasing ignition lag, increase in swirl ratio, variable valve timing and injection rate control (multiple injection); low $NO_x$ and PM by very high charge dilution rate and extremely low combustion temperature; and very high EGR rate. All relative terms are compared to a normal direct injection diesel engine.

By contrast, a typical direct injection light-duty diesel engine produces approximately 50 ppm $NO_x$, 1000 ppm CO and 800 ppm HC ($C_1$) at idle (exhaust gas temperature about 185° C.); and approximately 1250 ppm $NO_x$, 70 ppm CO and 30 ppm HC ($C_1$) at high load (exhaust gas temperature about 500° C. (all values engine out)).

We have investigated the emissions of a vehicle including one of the new generation of engines, and have found that, despite the improvements in reduced $NO_x$ and PM, they can produce high levels of CO relative to a conventional direct injection diesel engine. Such CO emissions can be characterised by an exhaust gas composition of >2000 ppm CO, such as >2500-10000 ppm CO e.g. >3000 ppm CO, >4000 ppm CO, >5000 ppm CO, >6000 ppm CO, >7000 ppm CO, >8000 ppm CO or >9000 ppm CO, below e.g. about 250° C. during conditions wherein substantially all fuel for combustion is injected into a combustion chamber prior to the start of combustion.

Additionally, we have observed that such diesel engines can produce a relatively high level of HC below e.g. about 250° C., e.g. less than 200° C. or less than 150° C., during low $NO_x$ operating conditions, such as >500 ppm e.g. from 600-1000 ppm, illustratively 700 ppm HC, 800 ppm HC or 900 ppm HC, $C_1$ unburned hydrocarbon (HC).

Furthermore, we believe that unsaturated hydrocarbons can result from the incomplete combustion of diesel fuel, examples of which are ethylene, propylene, aromatics and polyaromatics. Release of certain unsaturated HCs is undesirable for environmental and health reasons.

It is known that current direct injection diesel engines can produce exhaust gas comprising >2000 ppm CO under certain operating conditions, e.g. at cold start as part of a warm-up strategy or following hard acceleration. However, we believe that the current diesel engines do not emit such high levels of CO under normal driving conditions or such high levels of CO in combination with such high levels of HC during normal operation, e.g. at temperatures of up to 250° C.

In our EP 0341832 we disclose a process for combusting diesel particulate deposited on a filter in nitrogen dioxide ($NO_2$) at up to 400° C., which $NO_2$ is obtained by oxidising nitrogen monoxide (NO) in the exhaust gas over a suitable catalyst disposed upstream of the filter. The NO oxidation catalyst can comprise a platinum group metal (PGM) such as Pt, palladium (Pd), ruthenium (Ru), rhodium (Rh) or combinations thereof, particularly Pt. The filter can be coated with material which facilitates higher temperature combustion such as a base metal catalyst, e.g. vanadium oxide, La/Cs/$V_2O_5$ or a precious metal catalyst. Such a system is marketed by Johnson Matthey as the CRT®.

SUMMARY OF THE INVENTION

We have now identified a family of catalysts that are particularly effective in converting relatively high levels of CO in exhaust gas produced by the new generation of compression ignition engine, particularly at temperatures below about 250° C. Our research also shows that these catalysts are more effective at treating certain HC than Pt DOC alone in exhaust gas comprising relatively high levels of CO, for example at temperatures below about 250° C. Indeed, we have found evidence of synergy for treating HC, including unsaturated HC, in systems comprising both Pt and Pd.

According to one aspect, the invention provides a process for treating exhaust gas from a compression ignition engine, wherein substantially all fuel for combustion is injected into a combustion chamber prior to the start of combustion, which process comprising contacting the exhaust gas with a catalyst comprising a supported palladium (Pd) catalyst.

By "metal" herein, we mean the oxidic compound existing in the presence of the constituents of exhaust gas, although in use they may be present as the nitrate, carbonate or hydroxide.

In one embodiment, the catalyst comprises at least one base metal promoter.

In another embodiment, the exhaust gas comprises >2000 ppm CO.

In a further embodiment, the exhaust gas comprises >500 ppm $C_1$ unburned hydrocarbons (HCs) and optionally is at below 250° C.

In a further embodiment, the catalyst comprises Pt, and it is preferably arranged so that the exhaust gas contacts the Pd catalyst and then contacts the Pt.

In a further embodiment, combustion of CO in the exhaust gas over the Pd creates an exotherm to heat the Pt, thereby promoting reactions of exhaust gas components catalysed by the Pt, including HC oxidation and combustion of PM.

According to a further aspect, the invention provides a compression ignition engine wherein substantially all fuel for combustion is injected into a combustion chamber prior to the start of combustion, which engine comprising an exhaust system comprising a supported palladium (Pd) catalyst.

According to one embodiment, the catalyst comprises at least one base metal promoter.

According to another embodiment, the engine produces exhaust gas comprising >2000 ppm CO.

According to one embodiment, the engine produces exhaust gas comprising >500 ppm $C_1$ unburned hydrocarbons (HC).

According to another embodiment, the engine produces exhaust gas including the defined amounts of CO and/or HC at an exhaust gas temperature of below about 250° C.

DETAILED DESCRIPTION OF THE INVENTION

In a particular embodiment, depending on the exhaust gas composition produced by the engine, it can be useful to include Pt on the same support as the Pd or a different support. Pt can be particularly useful for oxidising unsaturated HCs, and is, of course, used as a major component of conventional DOCs for treating VOF and SOF. Hence an advantage of a catalyst for use in the invention comprising both Pd and Pt is that it can treat a wider range of HC. One reason for this is that an exotherm generated by the Pd component in the CO can increase the temperature of the Pt component to above its HC light-off temperature.

The at least one base metal promoter for the Pd catalytic component can be a reducible oxide or a basic metal or a mixture of any two or more thereof. Illustrative examples of reducible oxides are at least one of manganese, iron, tin, copper, cobalt and cerium, such as at least one of $MnO_2$, $Mn_2O_3$, $Fe_2O_3$, $SnO_2$, CuO, CoO and $CeO_2$. The reducible oxide can be dispersed on a suitable support and/or the support per se can comprise particulate bulk reducible oxide. An advantage of $CeO_2$ is that it is relatively thermally stable, but it is susceptible to sulfur poisoning. Manganese oxides are not as thermally stable, but they are more resistant to sulfur poisoning. Manganese oxide thermal stability can be improved by combining it in a composite oxide or mixed oxide with a stabiliser, such as zirconium. To some extent, ceria can be made more sulfur tolerant by forming a composite oxide or a mixed oxide with a suitable stabiliser, such as zirconium.

By "reducible oxide" herein, we mean that an oxide is present in situ wherein the metal has more than one oxidation state. In manufacture, the metal can be introduced as a non-oxide compound and oxidised by calcinations to the reducible oxide.

The basic metal can be an alkali metal, e.g. potassium, sodium or caesium, an alkaline earth metal, such as barium, magnesium, calcium or strontium, or a lanthanide metal, e.g. cerium, praseodymium or lanthanum, or any mixture, composite oxide or mixed oxide of any two or more thereof. In systems comprising two or more basic metal promoters, it is desirable to prevent interaction between the basic metals. Accordingly, it is preferred that no more than 3 wt % of the Pd catalyst comprises basic metal promoter.

In one embodiment, the basic metal is ceria, and the Pd is supported on particulate ceria, i.e. the particulate ceria serves as the Pd support and promoter.

Alternatively, the support for the or each PGM can be any conventional support known in the art such as alumina, magnesia, silica-alumina, titania, zirconia, a zeolite or a mixture, composite oxide or mixed oxide of any two or more thereof, and can be doped, as conventional in the art with a basic metal. Non-limiting examples of the basic metal dopants are zirconium, lanthanum, alumina, yttrium, praseodymium, cerium, barium and neodymium. The support can be, for example, lanthanum-stabilised alumina, or a composite oxide or a mixed oxide comprising ceria and zirconia, optionally in a weight ratio of from 5:95 to 95:5.

"Composite oxide" as defined herein means a largely amorphous oxide material comprising oxides of at least two elements which are not true mixed oxides consisting of the at least two elements.

Suitable mixed oxides and composite oxides for the present invention may be prepared by conventional means, namely co-precipitation. For example, solutions of soluble salts of the metals may be mixed in the appropriate concentrations and amounts to yield the desired end product, then caused to precipitate concurrently, for example by adding a base such as ammonium hydroxide. Alternatively, other preparative routes utilising generally known technology, such as sol/gel or gel precipitation, have been found suitable. The precipitated oxides as slurries may be filtered, washed to remove residual ions, dried, then fired or calcined at elevated temperatures (>450°+C.) in air.

A 85Mn:15Zr composite oxide material can be prepared as follows. Manganese nitrate (121.76 g, 0.425 mol) and aluminium nitrate (28.14 g, 0.075 mol) are dissolved in demineralised water to give 400 ml of solution. This solution was added carefully over two minutes to an overhead stirred ammonia solution (150 ml, 2.25 mol diluted to 500 ml). The precipitate slurry was stirred for five minutes and then allowed to 'age' for thirty minutes. The precipitate was recovered by filtration and washed until the conductivity of the filtrate was 1500 $\mu Scm^{-1}$. The material was dried at 100° C. and then fired at 350° C. for two hours (ramp up and down 10° C./min).

The catalyst can contain from 0.1 to 30% by weight, optionally from 0.5-15% and preferably 1-5%, of PGM based on the total weight of the catalyst. In one embodiment, the catalyst contains a weight ratio of from 100:0 to 10:90 Pd:Pt. In a further embodiment, the catalyst contains from 0.1 to 10% Pt by weight based on the total weight of the catalyst and from 0.1 to 20% by weight based on the total weight of the catalyst. According to a further embodiment, the exhaust system comprises from 30-300 $gft^{-3}$ Pd and, where present, from 30-300 $gft^{-3}$ Pt.

The catalytic converter can comprise a conventional substrate, such as a ceramic, e.g. cordierite, or metal, e.g. Fecralloy™, honeycomb monolith. In a particular embodiment, one or both substrates comprise a particulate filter, such as a ceramic wall flow filter e.g. the upstream substrate can be a flow through substrate and the downstream substrate a filter.

The catalyst can be coated on a downstream end of the filter, if desired. Where the sole platinum group metal (PGM) present is Pd, a single substrate can be coated with a washcoat including the supported Pd and the at least one base metal promoter. However, where the catalyst includes also Pt, we envisage that the catalytic converter can take one of several forms.

In one embodiment, both the Pd and the Pt is supported on the same particulate support material.

In another embodiment, comprising a single substrate, the supported Pd and the at least one base metal promoter are coated on an upstream part of the substrate and the Pt is coated on a downstream part thereof, although the Pt can be upstream of the Pd if desired.

In an alternative embodiment, also comprising a single substrate, the Pt is disposed in a first layer on the substrate and the supported Pd and the at least one base metal promoter are disposed in a second layer overlying the first layer. However, if desired, the Pt can be in the over layer and the Pd in the under layer.

In a fourth embodiment also comprising a single substrate, the substrate is coated with a single washcoat layer, wherein the supported Pd and the at least one base metal promoter comprise a first particulate support and the Pt is carried on a second particulate support, wherein the first and second supports are disposed on a substrate in a single layer.

In an alternative embodiment, the exhaust system comprises a first substrate comprising the supported Pd and the at least one base metal promoter and a second substrate comprising the Pt, which second substrate is disposed downstream of the first substrate. The order of the first and second substrates can be reversed, if desired.

In the new generation of diesel engine-installed vehicles, the engines may be controlled to operate in a mode wherein substantially all fuel for combustion is injected into a combustion chamber prior to the start of combustion over the entire engine load-speed map. However, we envisage that in a particular embodiment, the engine control means can switch the engine to more conventional diesel combustion as is used in direct injection diesel engines at high loads. During such periods of "direct injection" running, levels of $NO_x$ and PM can require treatment in order for the vehicle as a whole to meet the relevant emission legislation.

According to a particular embodiment, the invention provides an engine according to the invention having a first running condition wherein the engine is configured to run during at least one portion of an engine cycle in a mode wherein substantially all fuel for combustion is injected into a combustion chamber prior to the start of combustion, and a second condition wherein the engine is configured to run in a conventional direct injection diesel engine mode. Control of the first and second running conditions can be effected by an engine control means associated with the engine e.g. comprising a pre-programmed processor such as a central processor unit (CPU), optionally forming part of the engine control unit (ECU).

Where additional exhaust gas after-treatment is required in order to treat exhaust gas during the second running condition, an optionally catalysed particulate filter can be disposed downstream of the Pd catalyst and associated at least one base metal promoter an, where present, the Pt catalyst. Such an arrangement is described in our EP 0341832, wherein NO in the exhaust gas is oxidised to $NO_2$ by the Pd catalyst and particulates in the exhaust gas collected on the filter are combusted in the $NO_2$ at temperatures of up to 400° C. The Pt catalyst can be disposed on the filter, as desired.

Where the engine according to the invention includes an exhaust gas recirculation valve and a circuit to recirculate a selected portion of the exhaust gas to the engine air intake, desirably the exhaust gas is cooled prior to mixing with the engine intake air.

The compression ignition engine according to the invention can be a diesel engine, for example, such as a light-duty diesel engine or a heavy-duty diesel engine, as defined by the relevant legislation.

Two embodiments of engines with which the exhaust system of the invention may be used with advantage are a homogeneous charge compression ignition (HCCI) diesel engine and a Dilution Controlled Combustion System (DCCS) diesel engine.

According to a further aspect, the invention provides a vehicle including an engine according to the invention.

EXAMPLES

In order that the invention may be more fully understood reference is made to the following Examples by way of illustration only. All temperatures given refer to inlet gas temperatures.

Example 1

A 2 wt % Pt-alumina-based catalyst (Catalyst A), a 2 wt % Pd-alumina-based catalyst (Catalyst B), and a 2 wt % Pd-ceria-containing catalyst (Catalyst C) were tested for HC and CO light-off in a simulated catalyst activity test (SCAT) gas rig. A sample of each catalyst was tested in the flowing gas mixtures set out in Table 1. The temperature of the gas mixtures used was increased during each test from 100° C. to 500° C.

TABLE 1

Gas mixtures used for activity tests for Catalysts A, B, and C

|  | Gas Mixture 1 | Gas Mixture 2 | Gas Mixture 3 | Gas Mixture 4 |
|---|---|---|---|---|
| ppm HC (C1) as propene | 600 | 900 | 3000 | 3000 |
| ppm CO | 200 | 600 | 25000 | 25000 |
| ppm NO | 200 | 200 | 200 | 200 |
| % $H_2O$ | 4.5 | 4.5 | 4.5 | 4.5 |
| % $O_2$ | 12 | 12 | 12 | 3 |
| % $CO_2$ | 4.5 | 4.5 | 4.5 | 4.5 |
| ppm $SO_2$ | 20 | 20 | 20 | 20 |
| $N_2$ | Balance | Balance | Balance | Balance |
| Flow Rate (litres/hour/g sample) | 300 | 300 | 300 | 300 |
| Ramp Rate (° C./min) | 10 | 10 | 10 | 10 |

Gas mixtures 1 and 2 have HC and CO gas concentrations as typical of exhaust gases from a conventionally operated Diesel engine. Gas mixture 3 has higher HC and CO concentrations than gas mixtures 1 and 2 and gas mixture 4 has a lower oxygen concentration than used in gas mixtures 1 to 3. Tables 2 and 3 show the temperature at which 80% oxidation conversion of HC and CO was achieved over each catalyst.

TABLE 2

Temperature for 80% conversion (T80 HC/CO) of Catalysts A, B and C in gas mixtures 1-3.

| T80 HC/CO (° C.) | Gas Mixture 1 | Gas Mixture 2 | Gas Mixture 3 |
|---|---|---|---|
| Catalyst A | 170/<110 | 158/114 | 185/183 |
| Catalyst B | 264/265 | 253/247 | 205/203 |
| Catalyst C | 231/164 | 226/170 | <110/<110 |

Catalyst A showed significantly higher activity than Catalyst B or C at lower temperatures for both HC and CO oxidation using the gas mixtures 1 and 2, but showed a loss in low temperature oxidation activity in the high HC and CO gas mixture 3. In contrast to the loss in activity in high HC, CO gas feeds for Catalyst A, Catalyst B showed a small improvement in low temperature oxidation activity from gas mixture 1 or 2 to gas mixture 3. However, despite the improved low temperature activity of Catalyst B for the higher HC and CO gas feed conditions, overall the activity of Catalyst B was poorer than that of Catalyst A. By contrast, Catalyst C showed lower activity under gas mixtures 1 and 2 relative to Catalyst A. However, in contrast to Catalyst A and Catalyst B, Catalyst C showed the highest activity for HC and CO oxidation at low temperatures under the high HC and CO gas concentration mixture 3.

Table 3 shows that the low temperature CO activity of Catalyst A was further decreased in gas mixture 4, consisting of 3% oxygen, compared to the activity measured in gas mixture 3, which included 12% oxygen. In contrast, the activity of Catalyst B was slightly improved in gas mixture 4 compared to gas mixture 3. The low temperature oxidation activity of Catalyst C remained very high in both gas mixtures 3 and 4. The data show that Pd is more active in the presence of CO than Pt.

TABLE 3

Temperature for 80% conversion (T80-CO) of Catalysts A, B and C in gas mixtures 3 and 4

| T80 CO (° C.) | Mixture 3 | Mixture 4 |
|---|---|---|
| Catalyst A | 183 | 239 |
| Catalyst B | 203 | 197 |
| Catalyst C | <110 | <110 |

Example 2

In another series of activity tests, Catalyst D (1 wt % Pt-alumina-based), and Catalyst E (4 wt % Pd-ceria-based), were tested for HC and CO light-off in a SCAT gas rig using the gas mixtures set out in Table 4, and the temperature of the gas passed over each sample was increased during each test from 100° C. to 500° C.

TABLE 4

Gas mixtures used for activity tests of Catalysts D and E

| | Gas Mixture 5 | Gas Mixture 6 | Gas Mixture 7 | Gas Mixture 8 | Gas Mixture 9 |
|---|---|---|---|---|---|
| ppm HC (C1) as toluene | 600 | 600 | 600 | 600 | 600 |
| ppm CO | 200 | 950 | 2000 | 10000 | 25000 |
| ppm NO | 200 | 200 | 200 | 200 | 200 |
| % $H_2O$ | 4.5 | 4.5 | 4.5 | 4.5 | 4.5 |
| % $O_2$ | 12 | 12 | 12 | 12 | 12 |
| % $CO_2$ | 4.5 | 4.5 | 4.5 | 4.5 | 4.5 |
| ppm $SO_2$ | 20 | 20 | 20 | 20 | 20 |
| $N_2$ | Balance | Balance | Balance | Balance | Balance |
| Flow Rate (litres/hour/g sample) | 300 | 300 | 300 | 300 | 300 |
| Ramp Rate (° C./min) | 10 | 10 | 10 | 10 | 10 |

For each gas mixture from 5 to 9, the CO concentration was progressively increased and the remaining gases were kept constant with a nitrogen balance. Table 5 shows the effect of CO concentration on the HC and CO light-off of the catalysts.

TABLE 5

Temperature for 80% conversion (T80-HC/CO) of Catalysts D and E in gas mixtures 5-9.

| T80 HC/CO (° C.) | Gas Mixture 5 | Gas Mixture 6 | Gas Mixture 7 | Gas Mixture 8 | Gas Mixture 9 |
|---|---|---|---|---|---|
| Catalyst D | 188/112 | 192/158 | 194/185 | 212/210 | 231/217 |
| Catalyst E | 259/135 | 256/130 | 175/<110 | <110/<110 | <110/<110 |

Catalyst D showed a loss in low temperature activity as the CO concentration was progressively increased, whereas Catalyst E showed improved low temperature activity with higher CO gas feeds. We infer that the loss in activity for Catalyst D is because of self-poisoning of the active sites on the catalyst. It is well known that the strong adsorption of CO on the Pt active sites may block the adsorption of oxygen necessary for the oxidative reaction to form $CO_2$. Catalyst E does not show this self-poisoning behaviour, and the activity of this catalyst to oxidise CO in higher CO concentrations is significantly improved over Catalysts A and D.

Example 3

Further SCAT rigs tests on Catalyst D (1 wt % Pt-alumina-based) and Catalyst E (4 wt % Pd-ceria-based) were carried out using the gas mixtures with 25000 ppm CO and two different HC concentrations (using either propene or toluene). A sample of each catalyst was placed in the gas mixtures shown in Table 6, and the temperature of the gas was increased from 100° C. to 500° C. The concentration of HC (as C1) was increased from 600 ppm to 3000 ppm using either propene or toluene as the HC species. The activity of the catalysts tested is given in Table 7.

TABLE 6

Gas mixtures used for activity tests on Catalyst A and Catalyst C

| | Gas Mixture 10 | Gas Mixture 11 | Gas Mixture 12 | Gas Mixture 13 |
|---|---|---|---|---|
| ppm HC (C1) as propene | 600 | 3000 | 0 | 0 |
| ppm HC (C1) as toluene | 0 | 0 | 600 | 3000 |
| ppm CO | 25000 | 25000 | 25000 | 25000 |

TABLE 6-continued

Gas mixtures used for activity tests on Catalyst A and Catalyst C

|  | Gas Mixture 10 | Gas Mixture 11 | Gas Mixture 12 | Gas Mixture 13 |
|---|---|---|---|---|
| ppm NO | 200 | 200 | 200 | 200 |
| % $H_2O$ | 4.5 | 4.5 | 4.5 | 4.5 |
| % $O_2$ | 12 | 12 | 12 | 12 |
| % $CO_2$ | 4.5 | 4.5 | 4.5 | 4.5 |
| ppm $SO_2$ | 20 | 20 | 20 | 20 |
| $N_2$ | Balance | Balance | Balance | Balance |
| Flow Rate (litres/hour/g sample) | 300 | 300 | 300 | 300 |
| Ramp Rate (° C./min) | 10 | 10 | 10 | 10 |

TABLE 7

Temperature for 80% conversion (T80-CO/HC) of catalysts D and E in gas mixtures 10-13

| T80 HC/CO (° C.) | Gas Mixture 10 | Gas Mixture 11 | Gas Mixture 12 | Gas Mixture 13 |
|---|---|---|---|---|
| Catalyst D | 186/184 | 218/218 | 231/217 | 230/231 |
| Catalyst E | <110/<110 | <110/<110 | <110/<110 | <110/<110 |

For gas mixtures 10 and 12 (containing 25000 ppm CO, 600 ppm HC), Catalyst E showed the highest activity for HC and CO light-off. The light-off activity of Catalyst D deteriorated in gas mixtures 11 and 13 (containing 25000 ppm CO, 3000 ppm HC) relative to the activity found for gas mixtures 10 or 12. The activity of Catalyst E in all the gas mixtures used remained higher than that of Catalyst D.

Example 4

Further SCAT rig tests on Catalyst A, Catalyst B, and Catalyst C were carried out using gas mixtures with 10000 ppm CO and four different HC concentrations (using propene). A sample of each catalyst was tested in the gas mixtures in Table 8, and the temperature of the gas was increased from 100° C. to 500° C. The concentration of HC (as C1) was increased from 600 ppm to 4500 ppm (propene). The activity of the catalysts is shown in Table 9.

TABLE 8

Gas mixtures used for activity tests of Catalysts A, B and Catalyst C

|  | Gas Mixture 14 | Gas Mixture 15 | Gas Mixture 16 | Gas Mixture 17 |
|---|---|---|---|---|
| ppm HC (C1) as propene | 600 | 1800 | 3000 | 4500 |
| ppm CO | 10000 | 10000 | 10000 | 10000 |
| ppm NO | 200 | 200 | 200 | 200 |
| % $H_2O$ | 4.5 | 4.5 | 4.5 | 4.5 |
| % $O_2$ | 12 | 12 | 12 | 12 |
| % $CO_2$ | 4.5 | 4.5 | 4.5 | 4.5 |
| ppm $SO_2$ | 20 | 20 | 20 | 20 |
| $N_2$ | Balance | Balance | Balance | Balance |
| Flow Rate (litres/hour/g sample) | 300 | 300 | 300 | 300 |
| Ramp Rate (° C./min) | 10 | 10 | 10 | 10 |

TABLE 9

Temperature for 80% conversion (T80-CO/HC) of Catalysts A, B and C in gas mixtures 14-17.

| $C_3H_6$ | Catalyst A | | Catalyst B | | Catalyst C | |
|---|---|---|---|---|---|---|
| ppm | CO $T_{80}$ | $C_3H_6 T_{50}$ | CO $T_{80}$ | $C_3H_6 T_{50}$ | CO $T_{80}$ | $C_3H_6 T_{50}$ |
| 600 | 159 | 156 | 169 | 176 | 121 | <110 |
| 1800 | 159 | 165 | 179 | 177 | 130 | 134 |
| 3000 | 161 | 162 | 179 | 177 | 136 | 135 |
| 4500 | 161 | 170 | 180 | 179 | 133 | 142 |

Catalyst C exhibits the highest activity for HC and CO oxidation in the gas feed that contained 600 ppm HC. Catalyst B had the poorest activity. Increased levels of HC caused a slight drop in catalyst activity, but even at the highest HC levels Catalyst C had much lower temperature activity for oxidation light-off compared to Catalysts A and B.

Example 5

A further series of SCAT tests with Catalyst C (2 wt % Pd-ceria), Catalyst F (2.5 wt % Pt-alumina-based) and Catalyst G (1.25 wt % Pt/1 wt % Pd—which is a mixture of Catalyst C and Catalyst F) were conducted using gas mixtures with 1% CO and three different HC species at 1000 ppm (C3) concentration. The test procedure was as described in Example 1 above and the gas mixtures are shown in Table 10. The activity of the catalysts tested is given in Table 11.

TABLE 10

Gas mixtures used for activity tests on Catalysts C, F & G

|  | Gas Mixture 18 | Gas Mixture 19 | Gas Mixture 20 |
|---|---|---|---|
| ppm HC (C3) as propene | 1000 | 0 | 0 |
| as ethene | 0 | 1000 | 0 |
| as ethane | 0 | 0 | 1000 |
| ppm CO | 10,000 | 10,000 | 10,000 |
| ppm NO | 200 | 200 | 200 |
| % $H_2O$ | 4.5 | 4.5 | 4.5 |
| % $O_2$ | 12 | 12 | 12 |
| % $CO_2$ | 4.5 | 4.5 | 4.5 |
| ppm $SO_2$ | 20 | 20 | 20 |
| $N_2$ | Balance | Balance | Balance |
| Flow Rate (litres/hour/g sample) | 300 | 300 | 300 |
| Ramp Rate (° C./min) | 10 | 10 | 10 |

TABLE 11

Temperature for 80% and 50% conversion (CO/HC) of Catalysts C, F, and G in gas mixtures 18, 19 and 20.

| HC Species | Catalyst C | | Catalyst F | | Catalyst G | |
|---|---|---|---|---|---|---|
|  | CO$_{T80}$ | HC$_{T50}$ | CO$_{T80}$ | HC$_{T50}$ | CO$_{T80}$ | HC$_{T50}$ |
| $C_3H_6$ | 136 | 135 | 161 | 162 | 137 | 139 |
| $C_2H_4$ | <110 | 186 | 160 | 167 | 129 | 127 |
| $C_2H_6$ | <110 | 367 | 159 | 301 | 137 | 303 |

Whilst Catalyst C remains highly effective for CO oxidation at low temperature, Catalyst F remains more effective for small chain HC oxidation except for propene. The mixed system Catalyst G showed good CO activity with not dissimilar activity to Catalyst C. Catalyst G showed equivalent propene light off to Catalyst C and considerably lower light off for ethene and ethane, demonstrating the strong synergistic effect achieved by combining both catalyst formulations.

Example 6

The effect of other metal supports was assessed for comparison with Catalyst A (2 wt % Pd—$Al_2O_3$) and Catalyst C (2 wt % Pd—Ce) in gas mixture 3 (high CO and HC concentrations) and gas mixture 21 (low CO and HC concentrations). Additional catalysts evaluated were Catalyst H (2 wt % Pd—$MnO_2$ (Aldrich)), Catalyst I (2 wt % Pd—Mn:Zr [85.15]) and Catalyst J (2 wt % Pd-20% Ba/$Al_2O_3$). The test procedure was as before and gas mixtures are shown in Table 12, with catalyst activity summarised in Table 13.

TABLE 12

Gas mixtures used for activity tests on Catalyst A, C, H, I, and J.

|  | Gas Mixture 21 | Gas Mixture 3 |
|---|---|---|
| ppm HC (C1) as propene | 900 | 3000 |
| ppm CO | 1000 | 25000 |
| ppm NO | 200 | 200 |
| % $H_2O$ | 4.5 | 4.5 |
| % $O_2$ | 12 | 12 |
| % $CO_2$ | 4.5 | 4.5 |
| ppm $SO_2$ | 20 | 20 |
| $N_2$ | Balance | Balance |
| Flow Rate (litres/hour/g sample) | 300 | 300 |
| Ramp Rate (° C./min) | 10 | 10 |

TABLE 13

Temperature for 80% and 50% conversion (CO/HC) of Catalysts A, C, H, I and J in gas mixtures 3 and 21.

|  | Gas Mixture 21 | | Gas Mixture 3 | |
|---|---|---|---|---|
| Catalyst | CO $T_{80}$ | HC $T_{50}$ | CO $T_{80}$ | HC $T_{50}$ |
| A | 230 | 230 | 183 | 176 |
| C | 175 | 200 | <110 | <110 |
| H | <110 | 159 | <110 | <110 |
| I | 152 | 189 | <110 | <110 |
| J | 202 | 211 | 167 | 160 |

Both Mn containing catalysts H and I show equivalent performance to Catalyst C with high CO concentrations but also lower light off with low CO concentrations. Addition of Ba (Catalyst J) shows improved performance with high CO compared to low CO concentration and has superior activity compared to Catalyst A.

Example 7

A 1.9 liter, common rail, direct injection, turbo charged, diesel vehicle certified for European Stage 3 legislative requirements, and fuelled with <10 ppm sulphur-containing diesel fuel, was fitted with ceramic supported catalysts 4.66 in (118 mm) diameter and 6 in (152 mm) long. Catalyst K was coated with platinum catalyst at 140 g ft$^{-3}$ (4.85 g liter$^{-1}$) and Catalyst L was coated with platinum catalyst at 70 gft$^{-3}$ (2.43 g liter$^{-1}$) and palladium-ceria catalyst at a palladium loading of 70 gft$^{-3}$ (2.43 g liter$^{-1}$). Before testing, the catalysts were aged for 5 hours at 700° C.

The engine exhaust emissions were modified to reproduce a range of exhaust gas conditions. These variations were achieved by allowing one or more of the following parameters to be changed: EGR rate, pilot injection timing and quantity of fuel injected, main injection timing, common rail fuel pressure and boost pressure of the turbo charger. With these calibration changes it was possible to increase HC and CO levels from the engine.

Both catalysts were evaluated in the European three-test cycle with the standard production calibration (Base). They were then evaluated with a calibration which produced CO emissions three times higher than the base calibration. Table 14 summarises the results for both catalysts with both calibrations.

TABLE 14

Results (g/km) with Catalyst A and B for both calibrations.

|  |  | g/km | |
|---|---|---|---|
|  |  | Catalyst K (Pt) | Catalyst L (Pt + Pd) |
| Base Calibration | Engine Out HC | 0.19 | 0.21 |
|  | Engine Out CO | 1.43 | 1.42 |
|  | Engine Out NOx | 0.38 | 0.38 |
|  | Tailpipe HC | 0.014 | 0.009 |
|  | Tailpipe CO | 0.042 | 0.041 |
|  | Tailpipe NOx | 0.37 | 0.38 |
| High CO Calibration | Engine Out HC | 0.39 | 0.39 |
|  | Engine Out CO | 4.55 | 4.28 |
|  | Engine Out NOx | 0.72 | 0.78 |
|  | Tailpipe HC | 0.122 | 0.08 |
|  | Tailpipe CO | 1.58 | 0.398 |
|  | Tailpipe NOx | 0.73 | 0.77 |

From Table 14 it can be seen that with the Base Calibration the catalysts have very similar performance with regard to CO removal. With the high CO calibration the Catalyst L has much lower tailpipe HC and CO emissions than Catalyst K.

The method used to increase the CO emissions from the engine also resulted in a noticeable increase in $NO_x$. This would not occur in the type of engine designed specifically to operate under conditions which would result in these high CO emissions. However, the results show that the oxidation performance of both catalysts is independent of $NO_x$ concentration. Therefore, using a constant concentration of 200 ppm $NO_x$ in the synthetic gas test had no influence on the results obtained for HC and CO oxidation.

The invention claimed is:

1. An apparatus comprising:
   a diesel engine;
   means for controlling an operating mode of the engine; and
   an engine exhaust system comprising a catalyst comprising palladium (Pd) supported on a support material and at least one base metal promoter associated with the palladium, wherein said at least one base metal promoter comprises at least one reducible oxide, and wherein the operating mode is defined when substantially all fuel for combustion in the engine is injected into a combustion chamber of the engine prior to the start of combustion during at least a portion of an engine cycle.

2. An apparatus according to claim 1, wherein the engine-out exhaust gas produced by the engine operated in the mode wherein substantially all fuel for combustion in the engine is injected into a combustion chamber of the engine prior to the start of combustion during at least a portion of an engine cycle further comprises >500 ppm $C_1$ unburned hydrocarbons.

3. An apparatus according to claim 1, wherein a temperature of the engine-out exhaust gas produced by the engine operated in the mode wherein substantially all fuel for combustion in the engine is injected into a combustion chamber of the engine prior to the start of combustion during at least a portion of an engine cycle is below 250° C.

4. An apparatus according to claim 1, wherein the at least one reducible oxide is an oxide selected from the group consisting of manganese, iron, cobalt, copper, tin, and cerium and mixtures thereof.

5. An engine according to claim 4, wherein the at least one reducible oxide is selected from the group consisting of $MnO_2$, $Mn_2O_3$, $Fe_2O_3$, CuO, CoO, $SnO_2$ and $CeO_2$.

6. An apparatus according to claim 5, wherein the at least one reducible oxide is $CeO_2$.

7. An apparatus according to claim 4, wherein the at least one reducible oxide is an oxide of cerium.

8. An engine according to claim 1, wherein the at least one reducible oxide is dispersed on the support material.

9. An engine according to claim 1, wherein the support comprises particulate bulk reducible oxide.

10. An apparatus according to claim 1, wherein the catalyst further comprises platinum (Pt).

11. An apparatus according to claim 10, wherein the catalyst contains a weight ratio of from 100:0 to 10:90 Pd:Pt.

12. An apparatus according to claim 10, wherein the Pt is supported on a support material.

13. An apparatus according to claim 12, wherein the Pd and Pt are both supported on the same support material.

14. An apparatus according to claim 12, wherein the catalyst comprises an arrangement selected from the group consisting of:
 (i) the supported Pd and the at least one base metal promoter on a first substrate monolith and supported Pt on a second substrate monolith, wherein the second substrate monolith is disposed downstream of the first substrate monolith;
 (ii) the supported Pd and the at least one base metal promoter on an upstream part of a substrate of a substrate monolith and the supported Pt on a downstream part of the substrate monolith;
 (iii) the supported Pt in a first layer on a substrate and the supported Pd and the at least one base metal promoter are disposed in a second layer overlying the first layer; and
 (iv) a substrate monolith comprising a single layer wherein the Pd and the at least one base metal promoter are supported on a first support material and the Pt is supported on a second support material.

15. An apparatus according to claim 12, wherein the catalyst contains from 0.1 to 10.0% Pt by weight based on the total weight of the catalyst and from 0.1 to 20% Pd by weight based on the total weight of the catalyst.

16. An apparatus according to claim 12, wherein the catalyst contains from 0.1 to 30.0% by combined weight of platinum group metal based on the total weight of supported catalyst.

17. An apparatus according to claim 10, wherein the catalyst comprises an arrangement selected from the group consisting of:
 (i) the supported Pd and the at least one base metal promoter on a first substrate monolith and the Pt on a second substrate monolith, wherein the second substrate monolith is disposed downstream of the first substrate monolith;
 (ii) the supported Pd and the at least one base metal promoter on an upstream part of a substrate monolith and the Pt on a downstream part of the substrate monolith; and
 (iii) the Pt in a first layer on a substrate monolith and the supported Pd and the at least one base metal promoter disposed in a second layer overlying the first layer.

18. An apparatus according to claim 1, wherein the Pd or Pt support material is selected from the group consisting of alumina; silica-alumina; ceria; magnesia; titania; zirconia; a zeolite; and mixtures, composite oxides or mixed oxides of any two or more thereof.

19. An apparatus according to claim 1, wherein the catalyst contains from 0.1 to 30.0% by combined weight of platinum group metal based on the total weight of supported catalyst.

20. An apparatus according to claim 1, wherein the exhaust system further comprises a particulate filter disposed downstream of the supported Pd.

21. An apparatus according to claim 1, wherein the diesel engine is a homogeneous charge compression ignition (HCCI) diesel engine or a Dilution Controlled Combustion System (DCCS) diesel engine.

22. An apparatus according to claim 1, wherein the control means controls the engine to operate in a conventional direct injection diesel engine mode during a portion of the engine cycle.

23. An apparatus according to claim 22, wherein the portion of the engine cycle wherein the engine is controlled to operate in the conventional direct injection diesel engine mode comprises high engine load.

24. An apparatus according to claim 1, wherein an engine out exhaust gas produced during the operating mode comprises >2000 ppm carbon monoxide.

25. An apparatus according to claim 1, wherein the support consists of the at least one reducible oxide.

26. An apparatus according to claim 1, wherein ceria serves as both the support material and as the base metal promoter.

27. A process for treating engine-out exhaust gas from a diesel engine operated in a mode wherein substantially all fuel for combustion is injected into a combustion chamber prior to the start of combustion, which process comprising contacting the exhaust gas with a catalyst comprising palladium supported on a support material and at least one base metal promoter associated with the palladium, wherein said at least one base metal promoter comprises at least one reducible oxide.

28. An process according to claim 27, wherein the at least one reducible oxide is an oxide of cerium.

29. A process according to claim 27, wherein the at least one reducible oxide is $CeO_2$.

30. A process according to claim 27, wherein the engine-out exhaust gas contains >2000 ppm carbon monoxide.

31. A process according to claim 27, wherein the support consists of the at least one reducible oxide.

32. A process according to claim 27, wherein ceria serves as both the support material and as the base metal promoter.

* * * * *